(12) United States Patent
Castellano

(10) Patent No.: US 6,575,569 B1
(45) Date of Patent: Jun. 10, 2003

(54) HEADLIGHT GLARE REDUCING OPHTHALMIC LENS SYSTEM

(76) Inventor: Perry J. Castellano, 6 North Ross Dr., Yorktown Heights, NY (US) 10598

( * ) Notice: Subject to any disclaimer, the term of this patent is extended or adjusted under 35 U.S.C. 154(b) by 0 days.

(21) Appl. No.: 10/171,614

(22) Filed: Jun. 17, 2002

(51) Int. Cl.[7] ................................................. G02G 7/16
(52) U.S. Cl. ............................ 351/45; 351/107; 351/47
(58) Field of Search .............................. 351/41, 44, 45, 351/46, 47, 103, 107; 2/431, 432, 433, 449, 450

(56) References Cited

U.S. PATENT DOCUMENTS

| | | | |
|---|---|---|---|
| 3,512,880 A | * 5/1970 | Alexander et al. | 351/45 |
| 3,639,044 A | * 2/1972 | Blair | 351/103 |
| 4,521,090 A | * 6/1985 | Pierquin | 351/124 |
| 6,159,397 A | * 12/2000 | Friedman | 264/1.7 |
| 6,386,702 B1 | * 5/2002 | Maloncon | 351/45 |
| 6,450,636 B1 | * 9/2002 | Ylipelkonen | 351/45 |

* cited by examiner

*Primary Examiner*—Huy Mai
(74) *Attorney, Agent, or Firm*—James F. Cottone

(57) ABSTRACT

A headlight glare reducing ophthalmic lens system is described as being incorporated into an eyeglass arrangement, or as an attachment to conventional eyeglasses, wherein the lens system is laterally adjustable to allow a user to select the amount of lens tint, or light transmisitivity, that is placed into his viewing path. A pair of lenses, each having a lateral gradient of tint distributed along its horizontal extent, is carried by a beam member which is laterally movable with respect to a corresponding track member to provide the desired amount of glare blocking or light attenuation dependent upon the actual driving conditions being encountered. Alternate embodiments disclose the use of telescoping sections which allow the user to tailor the baseline eyeglass version to his/her personal preferences, and a clip-on version is also described.

11 Claims, 2 Drawing Sheets

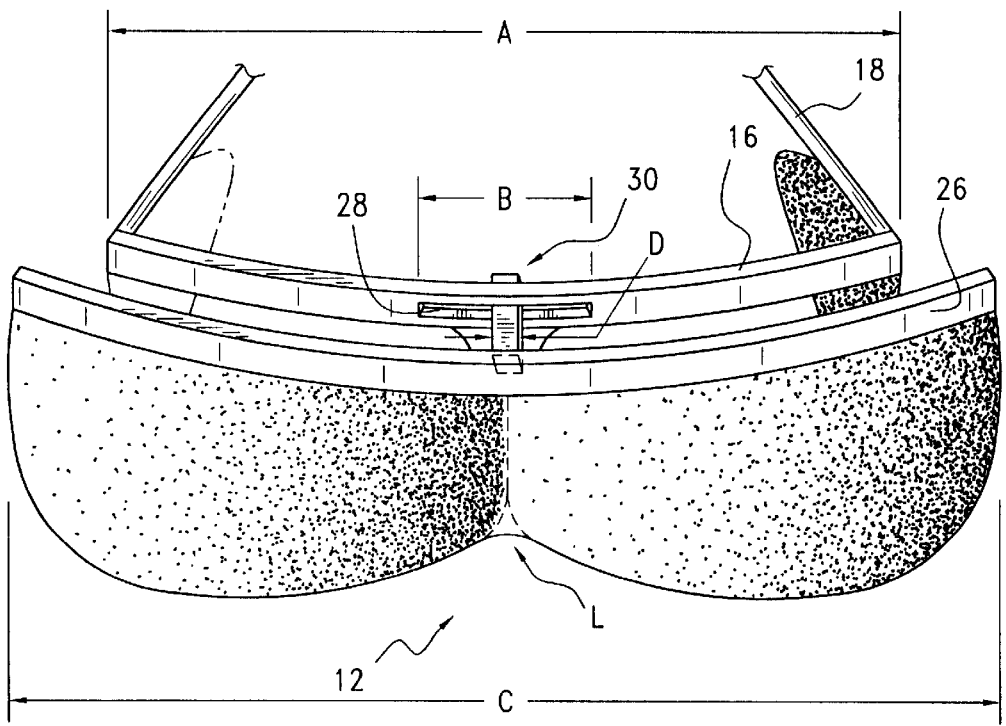
FIG.3
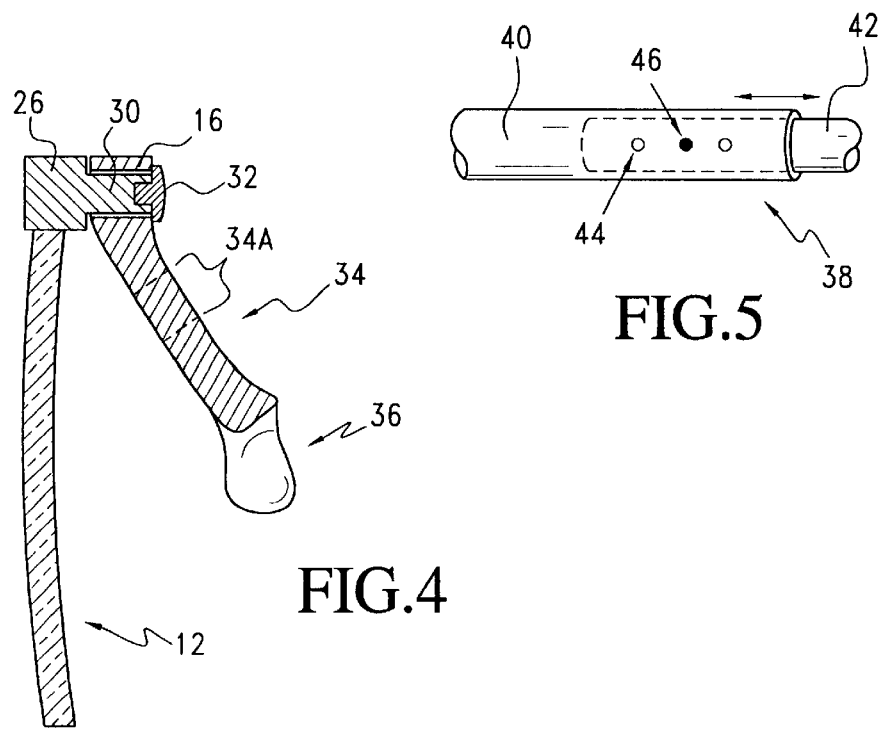
FIG.4
FIG.5

HEADLIGHT GLARE REDUCING OPHTHALMIC LENS SYSTEM

TECHNICAL FIELD

The present invention relates generally to means for reducing the nighttime glare from headlights of an oncoming vehicle as experienced by a motorist, and more particularly to an ophthalmic lens system having adjustable, horizontally gradient-tinted lenses which move in unison for user selection of the ideal amount of glare reduction depending on actual driving conditions being encountered.

BACKGROUND

Methods and apparatus for reducing the glare experienced by a driver due to the headlights of an oncoming vehicle have been the subject of many inventions and much development effort over the years. People worldwide have proposed and provided a wide variety of eyewear and vehicle-mounted devices to address this acute safety problem. While the danger of nighttime glare from headlights has been known for decades, recent developments have made the glare problem more acute. According to the Automobile Club of New York, " . . . complaints about headlight glare are up, and for good reason. There are more cars and trucks on the road, more sport-utility vehicles (with headlights set at sedan eye level) and an influx of imported high-intensity discharge beams (which cast a discomforting bluish beam). Considering an increasing driver population with eyes growing weak with age or tired from sleep-deprived lifestyles, and nighttime headlight glare is fast becoming a national problem."

The AAA Foundation for Traffic Safety, the Federal Highway Administration and automobile manufacturers have recently announced they are searching for solutions. However, they have not found any sure winners yet. It has been determined that where barriers separate opposing lanes of traffic, "glare screens" can be effective. The screens are actually a series of steel paddles cemented into the top of the barrier. This type of glare screen works, but they are expensive and can only be used on roads where a barrier exists.

The U.S. Department of Transportation's National Highway Traffic Safety Administration (NHTSA), in response to numerous consumer complaints about nighttime glare from headlights and auxiliary lights on motor vehicles, has recently sought public comment on possible steps the agency might take to reduce glare. As expressed through complaints to NHTSA, some drivers report that the light from high intensity discharge headlights seem blinding, even though the intensity of such lamps does not exceed federal standards. Some drivers say that "fog lamps" are producing troublesome glare and are often used unnecessarily on clear nights. Additionally, some drivers of passenger cars find that the higher-mounted headlights used on SUV's, pickup trucks and vans to be very glaring.

Description of typical prior art approaches to headlight glare reduction devices and systems may be found in a number of U.S. patents.

U.S. Pat. No. 3,512,880 to Alexander et al. provides a clear and early (1970) teaching of a basic approach of providing glare protective eyeglasses. Each lens of the eyeglass is tinted so as to provide light absorbing portions which gradually increase in absorption while progressing laterally along each of the pair of lenses.

The same basic approach of providing a driver with eyeglasses having a pair of gradient-tinted lenses to reduce headlight glare is found in Australian patent 206,513 to Sandifer. This 1957 patent also suggests the removability of the tinted lenses from conventional eyeglasses. A 1957 French patent to Lenattier also discloses this tinted lens approach, in the 1957 patent No. 1,134,943.

Regarding the feature of adjustability of tinted lenses, two early U.S. patents are of interest. These are U.S. Pat. No. 2,981,956 to Thompson and U.S. Pat. No. 1,723,475 to Esleck. In the '956 Thompson patent, one of the lens elements of a glare-shielding eyeglass is arranged to be slidably adjustable so as to accommodate different interpupillary distances. In the '475 patent to Esleck, a pair of tinted shields are slidably movable along the upper portion of glare-shielding eyeglasses to shield against strong lights and glare.

Three additional U.S. patents are of general interest for their teachings of various eyeglass arrangements, all directed to reducing glare experienced by a user. These are U.S. Pat. No. 5,428,409 to Silverstein, U.S. Pat. No. 4,859,047 to Badewitz and U.S. Pat. No. 4,828,380 to Cherian.

While each of these prior art devices and approaches functions more or less well, they have not to date provided an optimum solution to the nighttime headlight glare reducing problem, especially in view of the highly variable, real world conditions in which they are required to operate. It is exactly this need that the present invention admirably meets with its specially configured lateral adjustability, which greatly enhances the ability of a user to realize the benefits of the eyeglass arrangement taught herein.

Objects of the Invention

It is therefore a primary object of the present invention to provide an improved headlight glare reducing ophthalmic lens system having lateral adjustment means for optimizing glare reduction.

A further object of the present invention is to provide a specially configured eyeglass arrangement including a pair of gradient-tinted lenses mounted so as to permit lateral adjustability.

A still further object of the present invention is to provide a specially configured eyeglass arrangement wherein the gradient-tinted lens assembly is sized so as to exceed the temple-to-temple distance of its associated frame such that a harmful gap is eliminated as the lens assembly is adjusted to either of its lateral extremes.

A yet further object of the present invention is to provide an improved, laterally adjustable headlight glare reducing, gradient-tinted lens system in the form of personally adjustable eye wear, including at least one side shield and an extended length tinted lens assembly which precludes a gap occurring between the side shield and its closest lens.

In preferred and alternate embodiments, specially configured eyeglass arrangements are disclosed which teach an approach wherein side-to-side adjustability of a pair of gradient-tinted lenses are movable in tandem to allow the user to select the degree of tint (or degree of light attenuation) to be inserted into his viewing path. Via an adjustment means having a predetermined amount of lateral movement, and a slide pin of predetermined dimensions, all of which interconnects a front eyeglass track to a movable beam member carrying the pair of lenses, the relative dimensions of the track and beam may be optimized. To achieve this desired lateral 'optimum-tint position' adjustment, while avoiding the harmful 'gap' at the lens/side shield interference, the beam member must be greater in length than the track by amount which is fairly quantified.

By virtue of this and other adjustments (a bridge/nose pad, etc.), alternate clip-on embodiments may be retrofitted onto conventional prescription eyeglasses to provide the unique glare reduction capabilities according to the present invention.

BRIEF DESCRIPTION OF THE DRAWINGS

Additional objects and advantages of the invention will become apparent to those skilled in the art as the description proceeds with reference to the accompanying drawings, wherein:

FIG. 3 is a fragmented perspective view of an illustrative mechanism for implementing side-by-side adjustability of the lens system with respect to the ophthalmic frame carrying it;

FIG. 4 is a cross-sectional view showing an illustrative means for coupling the lens carrying beam to the front track of the ophthalmic frame; and FIG. 5 is a preferred telescoping assembly which may be used to enhance user-adjustability of the various length sensitive components of the eyeglass arrangement.

BEST MODE FOR CARRYING OUT THE INVENTION

Figure 1:
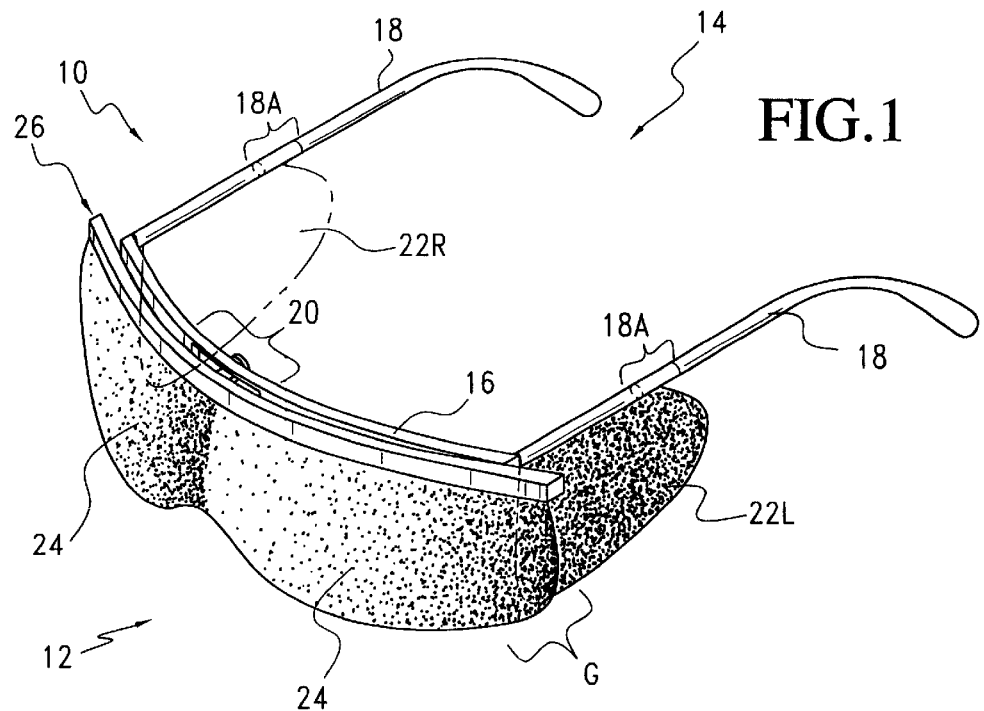
FIG. 1 is a perspective view of a headlight glare reducing ophthalmic lens system according to the present invention, as incorporated into a conventional eyeglass arrangement.

Referring now to FIG. 1, there is shown a perspective view of a headlight glare reducing ophthalmic lens system according to the present invention. By way of a brief overview, the glare reducing lens system is incorporated into a conventional eyeglass arrangement 10, having a front lens system 12 adjustably carried by an ophthalmic frame 14. The frame 14 includes a front track portion 16, a pair of temple elements 18 and an attachment area 20. At the attachment area 20, means are provided to both securely affix the front lens system 12 to the front track portion 16 of the frame 14, as well as to allow the critically needed lateral adjustability of the front lens system 12. A side shield 22L is affixed to the forward end of the temple element 18. In alternate embodiments, a second side shield 22R (shown in phantom) may be used in addition to or in lieu of the side shield 22L. Each of two lenses 24 making up the front lens system 12 includes an identical tint gradient disposed within it, the gradient being formed so as to gradually transition from exhibiting decreased light transmisitivity at its left extremity to exhibiting high light transmisitivity at its right extremity. At approximately their lateral midpoints, the lenses 24 exhibit an intermediate degree of light transmisitivity. As shown by the somewhat linear shading density, the tint gradient extends for the full vertical extent of each lens 24, and the pair of lenses are rigidly affixed to a horizontal beam 26. Note that the beam 26 is wider, or of greater lateral extent than the track 16 for lateral adjustability, as will be described below. The side shield 22L (and 22R when used) are solidly tinted (i.e., of low transmisitivity) throughout their full extent, and are at least as light blocking or attenuating as the most tinted part of the front lens system 12. Note, however, that for all of the heavily tinted areas, (these of lower light transmisitivity) the user still experiences an adequate degree of see-through vision.

Figure 2:
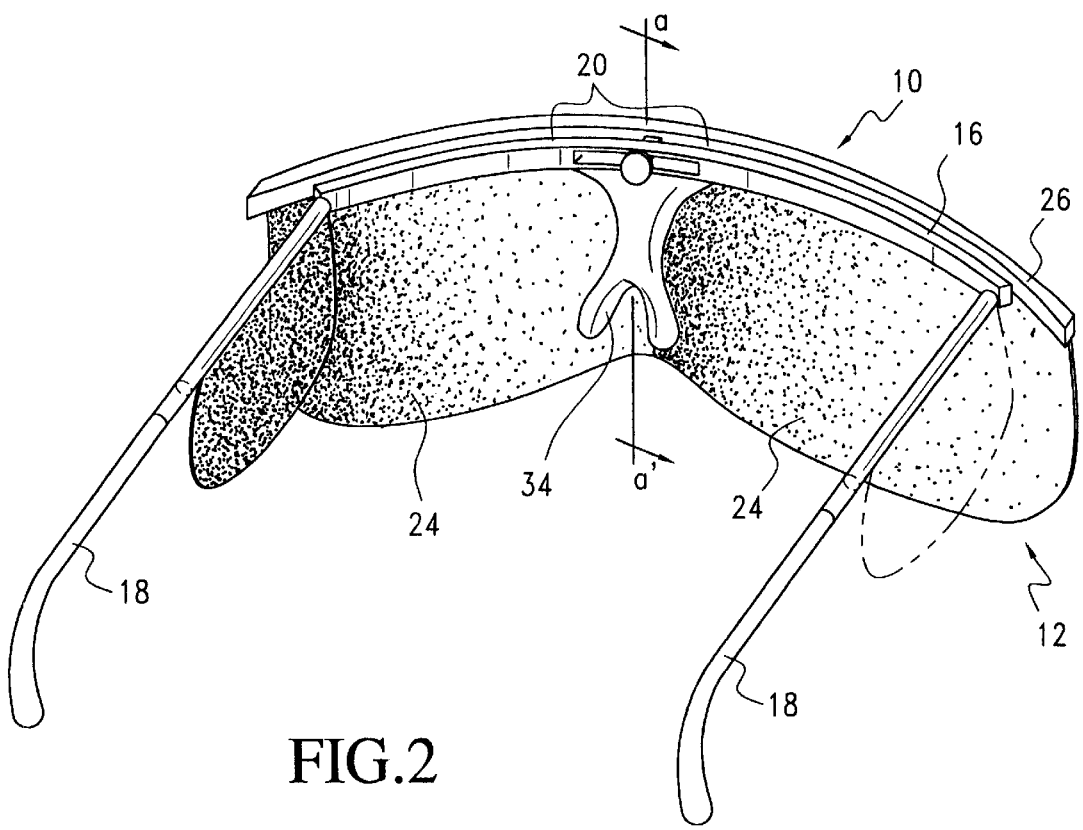
FIG. 2 is a driver's perspective view of the headlight glare reducing ophthalmic lens system in partial form to illustrate the placement of a nose pad/bridge assembly.

FIG. 2 shows the headlight glare reducing eyeglass arrangement 10 from the driver's perspective to illustrate the overall form and location of a nose pad/bridge assembly 34. This assembly 34 was purposely not shown in several of the other figures in order to avoid drawing clutter, and is described in detail below.

Lateral adjustability is vital to the utility and novelty of the present invention, and is best described with reference now to FIGS. 3 and 4. FIG. 3 is a fragmented perspective view showing a preferred mechanism for implementing side-to-side adjustability of the beam 26 (and the front lens system 12) with respect to the track 16 (and the ophthalmic frame 14). FIG. 4 is a cross-sectional view taken along the line a–a' of FIG. 2 showing a preferred mechanism for slidably coupling the beam 26 to the track 16.

In FIG. 3, the front track 16 is shown as having overall lateral extent (or width) "A" with an elongated rectangular slot 28 of lateral extent "B" formed into its mid-section. The beam 26 is formed so as to include an elongated slide pin 30, rectangular in cross-section, integrally affixed to and protruding rearwardly from its midpoint. The slide pin 30 is sized to fit snugly within the slot 28, as seen best in the FIG. 3 cross-section, and by virtue of its frictional fit may be positioned to and self-retained at any lateral location within the slot 28. The rectangular cross-section inhibits rotation of the front lens system 12 with respect to the frame 14. The slide pin 30 may be retained by an end cap 32, which may be snap fitted into a recess of the pin 30, or may be affixed by other well-known means, including the use of adhesives. The beam 26 has an overall lateral extent "C" greater than the track 16 lateral extent "A". The slide pin 30 may have a lateral extent of "D." Note that the track 16 and the beam 26 are curved arcuately so as to tend towards being 'face-formed.' Therefore the dimensions "A" and "C" represent the full left-to-right or lateral extent of these components— or for the dimensions "A" and "C," the length of the cord that intersects the ends of the curved components. In use, these dimensions function such that as the user laterally adjusts the front lens system 12 to accommodate diverse headlight glare or driving conditions, or his/her personal preferences or temple to temple distances, there is never an open gap of no tinted lens coverage either in the left or right extremity of the driver's vision.

In a preferred embodiment, these dimensions are related by:

$$C \geq A + B - D$$

where C is the minimal required lateral extent of the front lens system 12, A is the lateral extent of the track 16, B is the lateral extent of the track slot 28 and D is the lateral extent of the slide pin 30. Clearly, the amount of side-to-side adjustability is B minus D, so this amount is the amount that C must be greater than A to give the best "no gap" coverage; the larger the B minus D amount, the more variability of tint coverage. Especially precluded is the case where the front lens system 12 is moved to the full user's right position producing a severe gap allowing oncoming headlight glare to impinge on the left side of both eyes of the driver. Note also that the two lenses 24 making up the front lens system 12 are shown in FIGS. 1 and 2 as being formed as a unitary optical component. They may alternatively be formed as separate components as suggested by the dividing line "L" in FIG. 3.

In FIG. 4, a nose pad/bridge assembly 34 is shown as depending downwards from the front track 16 and terminating in a bifurcated nose pad portion 36. Note that the nose assembly 34 is purposely not shown in either FIGS. 1 or 3, so as to avoid drawing clutter. The nose assembly 34 is preferably integrally formed as part of the track 16 and located at its midpoint, protruding downward from the vicinity of and just below the track slot 28.

Referring now to FIG. 5, there is shown a preferred telescoping adjustment assembly which may be used to ensure a universally 'good fit' of the eyeglass arrangement 10. In the present invention, a 'good fit' for each user is not merely a convenience or user comfort related. An adjustably good fit for each user is an integral part of assuring that the side-by-side adjustability of the front lens system 12 is realized in order to accommodate a wide range of headlight glare conditions. While user comfort is part of this realization requirement, the efficacy of the side-to-side adjustability to eliminate lens tint gaps is closely bound up in maximizing headlight glare reduction by virtue of the lateral adjustability feature taught in the present invention.

Telescoping adjustment assembly 38 is shown as having an outer member 40, which is partially hollowed out along a longitudinal axis to accommodate entry of an inner member 42. The outer member 40 includes a number of holes distributed near the end of its length, of which hole 44 is typical. The inner member 42 carries a dimpled protrusion 46 sized to snap fit into one of the holes 44 to fix the assembly 38 in length. Both members 40 and 42 are shown as being elliptical in cross-section, but obviously other cross-sections may be employed as long as the two are slidably interfittable with a snug, slightly frictional fit. An adjustment assembly 38 may be inserted into both sections 18A (of FIG. 1) to provide user-adjustability to the length of temples 18, and may further be inserted into section 34A (of FIG. 3) to provide user-adjustability to the nose assembly 34. These nose/bridge adjustments serve to position the front lens system 12 just far enough forward from the user's face to allow free side-to-side movement of the front lens system 12 without hitting the user's nose. While the hole/detent approach of FIG. 4 is a common and illustrative one, other functionally equivalent approaches may be employed in its stead. The primary consideration is to provide a headlight glare reducing lens system wherein the adjustability is directed to optimizing the action of the lateral adjustment capability so as to permit the user/driver to set the degree of tint (or glare reduction) in response to driving conditions actually being encountered at the time, and/or in response to his or her personal preferences.

Beyond this optimized glare reduction, an additional benefit is realized by avoidance of a potentially dangerous gap resulting from improperly establishing the relative sizes of the various components of the system 10. With brief reference back to FIG. 1, there is shown a gap region or area "G" that would otherwise be formed if the user moves the front lens system 12 to his right to decrease the amount of incoming headlight glare. This involves moving the beam 26 to the driver's right and the unwanted gap "G" would have been created between the left edge of the left lens 24 and the front edge of the left side shield 22L.

The lenses 24 are preferably formed of ophthalmic quality CR-39 or polycarbonate, as compared to ophthalmic glass. Polycarbonate exhibits better shatter resistance as compared to CR-39, and is lighter in weight. The degree of tint or light attenuation causing the transmisitivity gradient of the lenses 24 may be imparted during fabrication by any of the well-known chemical production processes, including adding various types and amounts of dopants, and selecting the particular tint colors involved. Ideally, the light blocking or attenuating tint is set in the wavelengths where humans see most efficiently, and would allow some increased contrast for night conditions, yet allow headlight glare relief. Contemplated tints include a core tint of yellow or orange throughout the entire lens (i.e., the full lateral extent of each lens 24) with the horizontal gradient tint of brown added to provide additional glare relief. Yellow, orange and brown are all known to preserve or enhance contrast. Antireflective coatings may be applied to both the inner and outer surfaces of the lenses 24, and may be applied at some point after the tinting step to decrease inherent ophthalmic lens glare. The front lens system 12 of one tint combination may be changed to another combination by removing the end cap 32 and snapping into place another front lens system of preferred tint combination for overall driving conditions and user preference.

The frame 14 and the other non-optical components must be as light as possible while being robust, durable and impervious to contaminants. These may be made of the well-known materials such as plastic, metal, carbon fiber—even natural woods—with a suitable type of plastic being preferred.

A number of enhancements to the preferred embodiments described above are contemplated to improve the general utility of eyeglass arrangement 10. The front lens system 12 may be provided as a clip-on device wherein the beam 26 is slidably affixed to the front horizontal element of conventional eyeglasses. For this alternative embodiment, the slot 28 would be formed into the beam 26 to accommodate a clip-on mechanism (not shown). Additionally, the slot 28/pin 30 pair may be formed into the beam 26 and track 16, respectively, in the baseline embodiment. For use in countries where driving on the right side of the road is done, the tint gradient merely needs to be inverted laterally. Also, either one of the side shields 22L and 22R may be omitted, again depending on the direction of the most severe headlight glare expected to be encountered.

Although the invention has been described in terms of preferred and alternate embodiments, the invention should not be deemed limited thereto since other embodiments and modifications will readily occur to one skilled in the art. It is therefore to be understood that the appended claims are intended to cover all such modifications as fall within the true spirit and scope of the invention.

What is claimed is:

1. A glare reducing ophthalmic lens system having side-to-side or lateral adjustability of a pair of horizontally gradient-tinted lenses comprising:

(a) a frame having a front track member hingedly connected to a pair of temples, said pair of temples having a first lateral extent;

(b) a lens system carried by a beam member;

(c) said lens system including a pair of lenses having a second lateral extent greater than said first lateral extent, each lens having a tint gradient, the tint varying from low transmisitivity at a first side end of each lens to high transmisitivity at a second side end of each lens; and (d) said beam member slidably coupled to said track member by a coupling means which allows lateral adjustment of said pair of lenses with respect to said pair of temples.

2. The system of claim 1 wherein as said lens system is adjusted to either lateral extreme, each lens will extend to at least the same lateral extent as that of its closest temple.

3. The system of claim 2 wherein said pair of temples are left and right temples, and further comprises a left side shield affixed to the front end of a left temple, said left side shield having a low transmisitivity tint throughout and said low transmitivity tint allowing at least a useful amount of viewing capability.

4. The system of claim 3 wherein as said lens system is adjusted to its rightmost lateral extreme, no visual gap will be created between said left side shield and its closest lens.

5. The system of claim 4 wherein said pair of temples each include a telescoping length adjusting section which is user adjustable.

6. The system of claim 5 further comprising a nose bridge affixed at the midpoint of said beam member, said nose bridge including a telescoping length adjusting section which is user adjustable.

7. The system of claim 6, wherein said coupling means comprises an elongated rectangular pin having a third lateral extent, said pin affixed to the midpoint of said beam member, and a laterally elongated slot having a fourth lateral extent formed into said track member, whereby the most extreme left to right or right to left lateral adjustability of said lens system with respect to said temples is equal to said fourth lateral extent minus said third lateral extent.

8. The system of claim 7 wherein said second lateral extent is equal to or greater than said first lateral extent plus said fourth lateral extent minus said third lateral extent.

9. The system of claim 1 wherein said pair of temples are left and right temples, and further comprises one or more side shields taken from a group including left side and right side shields, said shields affixed to the front end of their corresponding temples, each side shield having a low light transmisitivity tint throughout, said low light transmisitivity tint allowing at least a useful amount of viewing capability.

10. The system of claim 9 wherein as said lens system is adjusted to either lateral extreme, no visual gap will be created between either of said side shields and its closest lens.

11. A method of reducing the nighttime headlight glare of an oncoming vehicle using an ophthalmic lens system having side-to-side or lateral adjustability of a pair of horizontal gradient-tinted lenses comprising the steps of:

(a) providing a frame having a front track member hingedly connected to a pair of temples, said pair of temples having a first lateral extent;

(b) providing a lens system carried by a beam member, said lens system including a pair of lenses having a second lateral extent greater than said first lateral extent, each lens having an identical tint gradient, the tint varying from low light transmisitivity at a first side end of each lens to high light transmisitivity at a second side end of each lens; and (c) providing a coupling means whereby said beam member is slidably coupled to said track member thus allowing lateral adjustment of said pair of lenses with respect to said pair of temples.

* * * * *